March 25, 1958

J. B. DYER ET AL 2,827,653

WINDSHIELD WIPER APPARATUS

Filed Aug. 31, 1953

INVENTORS
JOHN B. DYER
PAUL H. RUTHERFORD

BY George H. Strickland
THEIR ATTORNEY

March 25, 1958 J. B. DYER ET AL 2,827,653
WINDSHIELD WIPER APPARATUS
Filed Aug. 31, 1953 2 Sheets-Sheet 2

INVENTORS
JOHN B. DYER
PAUL H. RUTHERFORD
BY
George H. Strickland
THEIR ATTORNEY

United States Patent Office 2,827,653
Patented Mar. 25, 1958

2,827,653

WINDSHIELD WIPER APPARATUS

John B. Dyer, Syracuse, and Paul H. Rutherford, Rochester, N. Y., assignors to General Motors Corporation, Detroit, Mich., a corporation of Delaware Application August 31, 1953, Serial No. 377,436

6 Claims. (Cl. 15—253)

This invention pertains to means for wiping vehicle transparencies, and more particularly to means for wiping a curved windshield having front and side portions located in planes substantially 90° apart.

In the evolution of streamline bodies for motor vehicles, windshields have been designed with compound curved surfaces. This trend will undoubtedly continue, and in the future it can be expected that windshields will extend or "wrap around" the sides of the vehicle so as to eliminate the "blind spot" now caused by the corner posts. A typical example of this type of windshield is now used on the 1953 Cadillac Eldorado. With this type of windshield, i. e. a curved transparency in which the end portions are disposed in substantially parallel planes, adequate cleaning thereof cannot be accomplished with either straight, rigid wiping blades or flexible wiping blades of the type shown in United States Patent 2,596,063, Anderson, inasmuch as the wiping element, or blade, must clean surfaces which are located at right angles to each other. Accordingly, among our objects are the provision of means for mounting a wiping element so that during its oscillatory movement, the plane thereof will change to substantially conform to the windshield curvature; the further provision of means for actuating a wiping element to facilitate its cleaning a surface having portions located in planes separated by an angle of substantially 90°; the further provision of windshield wiper apparatus employing two blades in tandem to clean each side of such a windshield; and the still further provision of means for synchronizing the operation of the tandem blades on each side of the windshield.

The aforementioned and other objects are accomplished in the present invention by employing a bent actuating shaft and bevel gear arrangement to automatically alter the plane of the wiping element during its oscillatory movement. Specifically, the instant mechanism for automatically changing the plane of the wiping element includes a shaft mounted for oscillatory movement. An end portion of the shaft is bent throughout an angel determined by the curvature of the windshield to be cleaned. The bent end portion has journalled thereon a bevel gear to which the wiping element is attached. The bevel gear meshes with a bevel gear sector which is rigidly attached to the cowl structure of the motor vehicle. By reason of the bevel gear sector being stationary, the motion of the blade is the reverse of the shaft. Upon oscillatory movement of the shaft, the wiper element, or blade, will be "rocked" so as to keep it substantially normal to the windshield surface on both the front and side portions thereof.

In a motor vehicle installation four wiping elements are employed, two for each side of the windshield, which elements are operated in tandem. Each pair of elements, or blades, are actuated by an independent driving mechanism, and in order to synchronize movement of all blades during operation, power transmitting means are employed between the two pairs of blades. The several blades are mounted with relation to the windshield so that their wiping strokes overlap on the front portion thereof, and leave a small V-shaped unwiped portion which is not objectionable since it is well below the occupants' line of vision. The bevel gear driven blades are mounted so that their pivotal connection is substantially midway between the front and side portions of the windshield. In other words, the bevel gear driven blades, or auxiliary blades, are located at a point which substantially bisects the angle between the front and side portions of the windshield. The driving mechanism for the blades may be such as to move the blades beyond their normal wiping strokes and to a parked position, in which instance the main blade will be positioned against the cowl of the motor vehicle and the auxiliary blade will be positioned against the main blade.

Further objects and advantages of the present invention will be apparent from the following description, reference being had to the accompanying drawings wherein a preferred embodiment of the present invention is clearly shown, and wherein similar reference characters denote similar parts throughout the several views.

Figure 1:
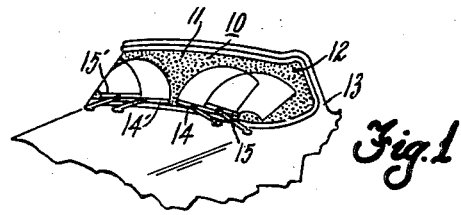
Fig. 1 is a fragmentary view, in perspective, of a motor vehicle equipped with the windshield wiping apparatus of this invention.

With particular reference to Fig. 1, it may be seen that the vehicle transparency, or a windshield, 10 includes a front portion 11 and "wrap around" side portions, only one, 12, of which is shown in Fig. 1. The configuration of the windshield surface is such that the side portions thereof are disposed in substantially parallel planes which are located in planes substantially 90° from the plane of the front portion 11. It will be appreciated that from the nature of the compound curved surface, a single wiping element, or blade, of conventional design, could not be used to clean a sufficient portion of the windshield. It will further be observed from an inspection of Fig. 1 that the corner post 13 of the vehicle is positioned a substantial distance to the rear as compared to the majority of present day vehicles. Accordingly, the present invention contemplates a cleaner comprising a conventionally mounted main blade 14 and an auxiliary blade 15, which are operated in tandem on each side of the windshield so as to clean sections of the front portion 11, as well as sections of the side portion 12. The wiper blades on the other side of the windshield as well as other portions of the vehicle are denoted by similar numerals with primes affixed.

Figure 2:
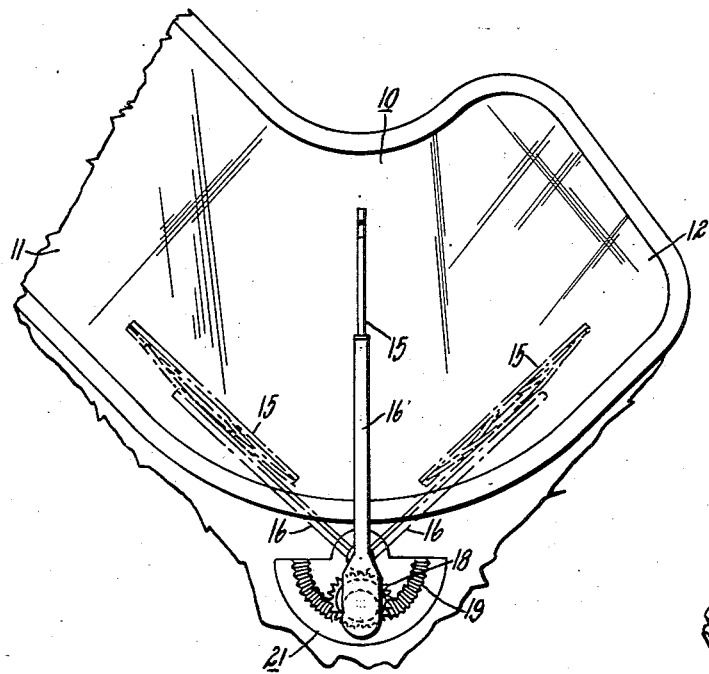
Fig. 2 is an enlarged fragmentary view, in perspective, of a corner portion of the windshield shown in Fig. 1.
Figure 3:
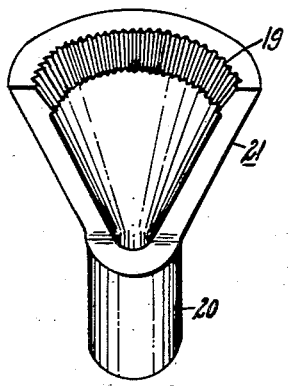
Fig. 3 is a view, in elevation, of the stationary bevel gear sector employed in this invention.
Figure 4:
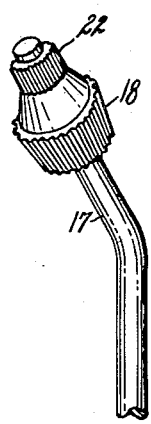
Fig. 4 is a fragmentaary view, in elevation, of the bent shaft and beveled gear assembly of this invention.

With particular reference to Figure 2, the configuration of the windshield and construction of the auxiliary wiper blade assembly will be described in greater detail. In Figure 2, it may be seen that the front portion 11 of the windshield 10 is disposed in a plane which is substantially 90° from the plane of the side portion 12. While the present invention is disclosed in conjunction with the windshield of the type presently used on the 1953 Cadillac Eldorado, it is to be understood that this use is only exemplanry and is not to be considered a limitation. As will appear more fully hereinafter, the present invention in one of its aspects, may be employed to wipe surfaces which are located in planes separated by either an acute or an obtuse angle.

The auxiliary wiping element, or blade, 15 may be of the type shown in the Anderson patent, previously referred to, and comprises a flexible blade portion composed of suitable resilient material, such as rubber, having attached thereto a pair of yokes, or links, which are pivotally joined at their midpoints by a third link, or yoke, the midpoint of which is detachably connected to a wiper arm 16. However, any other suitable wiper blade assembly, which is adapted to conform to the curvature of a windshield, may be employed. The full line position of the wiper blade 15, in Fig. 2, represents the midposition of the blade during its oscillatory movement, the end positions of which are represented by dotted lines.

With particular reference to Figs. 2 through 5, it may be seen that the wiper arm 16 is connected to a bevel gear 18, by a conventional serrated portion 22, that is associated with a shaft 17 which is rotatably supported for oscillation by means to be described. As is seen particularly in Fig. 4, one end portion of the shaft 17 is bent at an angle of substantially 28°, and has journalled thereon the bevel gear 18. It will be appreciated that the angle at which the shaft 17 is bent will determine the degree of "rocking" of the blade 15 during oscillation of the shaft. Accordingly, if it is desired to change the plane of action of the blade 15 so as to wipe surfaces which are disposed in planes at an angle greater or lesser than 90°, it is only necessary to change the angle at which the shaft is bent. The bevel gear 18 meshes with a stationary bevel gear sector 19, which is rigidly attached to the cowl structure of a motor vehicle, as shown in Fig. 2. The bevel gear sector is formed on an internal surface of a member 21 having a cylindrical portion 20, which is through bored to rotatably support the shaft 17. By reason of the bevel gear sector 19 being stationary, during oscillation of the shaft 17, movement of the blade 15 will be in the reverse direction.

Figure 5:
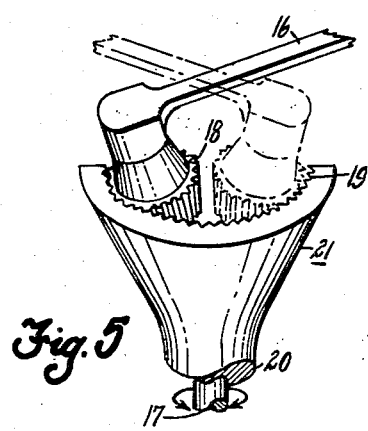
Fig. 5 is a fragmentary view, in perspective, of the wiper shaft and bevel gear sector assembly.
Figure 6:
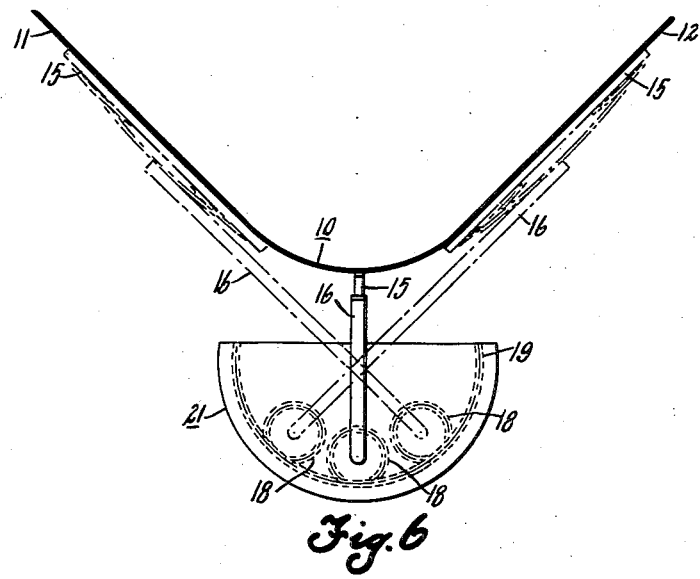
Fig. 6 is a diagrammatic view illustrating the mode of operation of the beveled gear driven blade.

With reference to Figures 2, 5 and 6, the mode of operation of the bevel gear driven windshield wiper will be described. Initially it should be noted that the wiper actuating shaft 17 projects through the cowl portion of the motor vehicle substantially midway between the front portion 11 and the side portion 12 of the windshield 10. In other words, the axis of the straight portion of the shaft 17 is disposed in a plane which substantially bisects the angle between the front and side portions of the windshield. The member 21 is attached to the motor vehicle so that the semi-cylindrical bevel gear section 19 faces the windshield 10. Moreover, the shaft 17 is journalled in the member 21 such that the bent end portion thereof is substantially parallel to the semi-conical surface of the bevel gear sector 19. When the wiper blade 15 is in the full line position of Fig. 2, the bevel gear 18 meshes with the medial portion of the bevel gear sector 19 so that the blade 15 is positioned substantially normal to the midpoint of the windshield 10 between the front and side portions. Accordingly, as the shaft 17 is rotated in a clockwise direction, as viewed in Figs. 2 and 6, to the full line position of Fig. 5, the bevel gear 18 will be rotated in a counterclockwise direction so as to move the wiper blade 15 to the dotted line position on the side portion 12 of the windshield. Conversely, when the shaft 17 is rotated in a counterclockwise direction, the blade 15 will be moved to the dotted line positions of Figs. 2 and 6 on the front portion 11 of the windshield. From an inspection of Figure 6, it may be seen that the plane of action of the wiper blade 15 continuously changes during oscillation of the shaft 17 between its end positions. In the present instance and with the bent shaft and bevel gear arrangement shown, the wiper blade will be positioned in planes substantially 90° apart at the end positions of the shaft 17. This phenomenon occurs by reason of the fact that as the bent shaft 17 oscillates, the axis of the bevel gear 18 is positioned in different planes which are adapted to follow the planes encountered in the curved windshield. In other words, during oscillation of the shaft 17, a compound motion is imparted to the blade 15, which compound motion is composed of an oscillatory motion and simultaneously therewith the blade 15 is moved throughout an angle toward and away from the axis of the straight portion of the shaft 17, in a plane substantially normal to the plane of oscillation, so as to follow the corner curvature of the windshield 10.

Figure 7:
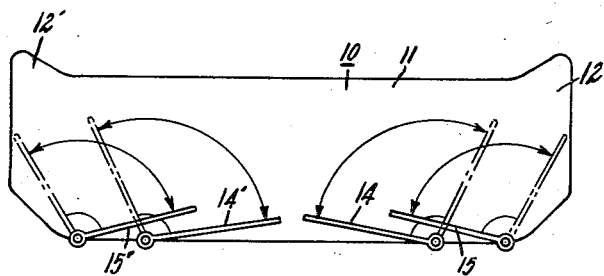
Fig. 7 is a diagrammatic view of the windshield wiping apparatus of this invention.
Figure 8:
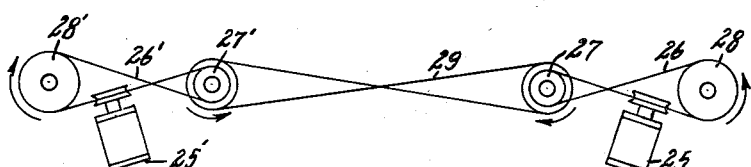
Fig. 8 is a schematic view of the driving and synchronizing means for the apparatus of Figs. 1, 7 and 8.

With reference to Figures 7 and 8, an arrangement for driving and synchronizing the four wiper blades for cleaning the windshield 10, will next be described. In Figure 1, the wiper blades 14 and 15 and 14' and 15' are shown in the parked position, wherein the blades 14 and 14' are moved against the cowl of the motor vehicle while the blades 15 and 15' are positioned against the main blades. This movement of the blades out of their normal range of movement and into a parked position may be accomplished by any suitable actuating mechanism such as the type disclosed in copending application, Serial No. 347,021, filed April 6, 1953, in the name of John B. Dyer, et al. The wiping strokes of the blades are indicated in Figure 7, from which it may be seen that the wiping strokes of the main auxiliary blades overlap each other on the front portion 11 of the vehicle transparency 10. Moreover, inasmuch as both the main and auxiliary blades are oscillated throughout an arc of substantially 105°, a small V-shaped unwiped portion on the front and side surfaces of the windshield is not wiped. However, this is not objectionable since the unwiped portion is remotely located from the normal range of vision of the vehicle occupants.

The gear ratio between the bevel gear 18 and the bevel gear sector 19 is approximately 1.25:1 such that oscillation of the shaft 17 throughout an angle of substantially 84° will move the wiper blade 15 throughout an angle of substantially 105°. Each pair of wiper blades, that is a main blade and an auxiliary blade, is driven from a separate mechanism which may be of the type disclosed in the aforementioned copending application. As shown schematically in Figure 8, the motion converting mechanism 25 is associated with a cable 26 for driving a pair of pulleys 27 and 28 in opposite directions. Similar parts of the mechanism for actuating the blades on the other side of the windshield are denoted by like numerals with primes affixed. The bent shafts for the auxiliary blades 15 and 15' are attached to the pulleys 28 and 28', while the shafts for the main blades 14 and 14' are attached to the pulleys 27 and 27'. It should be noted that pulleys 28 and 28' are larger than pulleys 27 and 27' so that the amplitude of oscillatory movement transmitted to the pulleys 28 and 28' will be less than the movement imparted to the pulleys 27 and 27', the arrangement being such that both the main and auxiliary wiping blades will be moved throughout an arc of 105° during their wiping strokes.

In order to synchronize the operation of each pair of wiping blades, the present invention contemplates a power transmitting interconnection between the two driving mechanisms. In the present instance, the power transmitting interconnection is shown as being a flexible cable 29, which is connected with pulleys 27 and 27' so as to maintain synchronism between the movement of wiper blades 14' and 15' and 14 and 15.

From the foregoing it is manifest that the present invention provides means for changing the plane of action of a wiper blade during its oscillatory movement. Moreover, by "rocking" the wiper blade during its oscillatory movement, the wiper blade may conveniently be employed to wipe a surface which has portions located in planes separated by either an acute, an obtuse or a right angle relative to each other. In addition, the present invention provides wiper apparatus wherein both the front and side portions of a curved windshield may be satisfactorily cleaned. Furthermore, this invention provides means for synchronizing the operation of two pair of wiper blades across the surface of a curved windshield.

While the embodiment of the present invention as herein disclosed, constitutes a preferred form, it is to be understood that other forms might be adopted.

What is claimed is as follows:

1. Means for imparting compound motion to a wiping element comprising, an oscillatable shaft, a wiping element, means interconnecting the wiping element and the shaft including a bevel gear journaled on said shaft, the axis of said bevel gear being adjustable to different positions during oscillatory movement of said shaft, and means engageable with said bevel gear for automatically adjusting the axis thereof during oscillation of said shaft.

2. Means for imparting compound motion to a wiping element comprising, an oscillatable shaft having a bent end portion disposed at an acute angle to an extension of the shaft axis, a wiping element, means interconnecting the wiping element and the shaft including a bevel gear journaled on the bent end portion of said shaft, and means engageable with said bevel gear and operable to shift the axis of said bevel gear during oscillatory movement of said shaft.

3. Means for imparting compound movement to a wiping element comprising, an oscillatable shaft having a bent end portion disposed at an acute angle to an extension of the shaft axis, a wiping element, means interconnecting the wiping element and the shaft including a first bevel gear rotatably supported on the bent end portion of said shaft, and a stationary bevel gear sector engageable with said first bevel gear such that during oscillatory movement of said shaft, the axis of the first bevel gear is shifted.

4. Means for imparting compound movement to a wiping element comprising, an oscillatable shaft having an end portion which is bent at an acute angle to an extended axis of the straight portion, a wiping element, means journaling the straight portion of said shaft for oscillatory movement, means interconnecting the shaft and the wiping element including a bevel gear rotatably supported on the bent end portion of said shaft, and means engageable with said bevel gear and operable to shift the axis of said bevel gear being shiftable during oscillatory movement of said shaft.

5. Means for imparting compound motion to a wiping element comprising, an oscillatable shaft having an end portion bent at an acute angle to an extended axis of the straight portion, a wiping element, a stationary member supporting the straight portion of said shaft for oscillatory movement, said member having a bevel gear sector formed thereon, and means interconnecting the wiping element and the shaft including a second bevel gear rotatably supported on the bent end portion of said shaft and engageable with said bevel gear sector, the axis of said second bevel gear being shiftable during oscillatory movement of said shaft.

6. Means for imparting compound movement to a wiping element comprising, an oscillatable shaft having an end portion bent at an acute angle to an extended axis of the straight portion, a wiping element, a stationary member rotatably supporting the straight portion of said shaft, said member having formed thereon a bevel gear sector, a bevel gear rotatably supported on the bent end portion of said shaft and engageable with said bevel gear sector, the axis of said bevel gear being shiftable during oscillatory movement of said shaft, and an arm interconnecting said bevel gear and said wiping element for imparting compound movement to said wiping element during oscillation of said shaft.

References Cited in the file of this patent

UNITED STATES PATENTS

| 1,062,322 | Conant | May 20, 1913 |
| 1,739,896 | Garbell | Dec. 17, 1929 |
| 1,964,109 | Cusset | June 26, 1934 |
| 2,298,484 | Horton | Oct. 13, 1942 |
| 2,412,319 | Carey | Dec. 10, 1946 |
| 2,533,963 | Sacchini | Dec. 12, 1950 |
| 2,691,186 | Oishei | Oct. 12, 1954 |

FOREIGN PATENTS

| 675,432 | Great Britain | June 27, 1950 |